US012691952B2

(12) United States Patent (10) Patent No.: US 12,691,952 B2
Sbongk et al. (45) Date of Patent: Jul. 28, 2026

(54) CLOSING PLUG

(71) Applicant: Illinois Tool Works Inc., Glenview, IL (US)

(72) Inventors: Albert Sbongk, Niederstetten (DE); Viviane Reibel, Creglingen (DE); Manuel Huebner, Aub (DE)

(73) Assignee: Illinois Tool Works Inc., Glenview, IL (US)

( * ) Notice: Subject to any disclaimer, the term of this patent is extended or adjusted under 35 U.S.C. 154(b) by 400 days.

(21) Appl. No.: 18/480,053

(22) Filed: Oct. 3, 2023

(65) Prior Publication Data

US 2024/0109603 A1 Apr. 4, 2024

(30) Foreign Application Priority Data

Sep. 26, 2023 (DE) ..................... 10 2023 126 008.1

(51) Int. Cl.
B62D 25/24 (2006.01)
(52) U.S. Cl.
CPC .................................... B62D 25/24 (2013.01)
(58) Field of Classification Search
CPC ...................................................... B62D 25/24
See application file for complete search history.

(56) References Cited

U.S. PATENT DOCUMENTS 5,353,472 A * 10/1994 Benda ........................ F16L 5/10
16/2.2
5,556,155 A * 9/1996 Welter ................... B60J 3/0278
296/97.9

| | | | |
|---|---|---|---|
| 6,319,436 B1 | 11/2001 | Jaeger | |
| 7,114,632 B2 | 10/2006 | Kraus | |
| 7,390,043 B2 * | 6/2008 | Kraus | B62D 25/24 |
| | | | 220/DIG. 19 |
| 8,613,476 B2 | 12/2013 | Dominguez | |
| 9,233,652 B2 | 1/2016 | Jatzke | |
| 9,309,972 B2 | 4/2016 | Sato | |
| 9,592,857 B2 * | 3/2017 | Eckstein | F16K 17/0453 |
| 10,179,612 B2 * | 1/2019 | Frank | B60R 13/00 |
| 2014/0361015 A1 | 12/2014 | Weiler | |
| 2015/0135598 A1 | 5/2015 | Jatzke | |
| 2021/0048105 A1 | 2/2021 | Wang | |

FOREIGN PATENT DOCUMENTS

| | | | |
|---|---|---|---|
| CN | 206938651 U | 1/2018 | |
| DE | 10333578 | * 10/2004 | |
| DE | 102015102169 A1 * | 8/2016 | F16J 13/08 |
| JP | S6159067 A | 3/1986 | |

* cited by examiner

*Primary Examiner* — Joseph D. Pape
(74) *Attorney, Agent, or Firm* — McAndrews, Held & Malloy, Ltd.

(57) ABSTRACT

Disclosed is a closing plug is provided for closing through-openings in components, such as components of motor vehicles. The closing plug includes a base body made from a hard component with a closing wall for covering a through-opening, and a sealing/fastening device made from a soft component. The soft component is configured to be sealed and connected to a wall of a carrier component that bounds a through-opening. The closing plug can be inserted into a through-opening in an assembly direction that extends orthogonally to a wall of a carrier component that bounds a through-opening.

20 Claims, 5 Drawing Sheets

CLOSING PLUG

CROSS-REFERENCE

The present application claims priority to German Patent Application Nos. DE 10 2022 125 567.0, filed Oct. 4, 2022, and DE 10 2023 126 008.1, filed Sep. 26, 2023; the contents of which are hereby incorporated by reference in its entirety.

BACKGROUND

In vehicle bodies, a plurality of holes and openings are provided to make vehicle cavities, such as the sills, accessible from the outside, in particular to make them accessible for the entry of corrosion protection agents.

Early in the manufacture of a motor vehicle, the body as a whole is typically subjected to phosphatation in a phosphating bath. A wash is then carried out in a cleaning bath, typically followed by a cataphoretic dip coating. For all of these processes, it is necessary that the respective liquids also enter the cavities of a body. For this purpose, the body has openings, in particular holes, which are to be subsequently closed to prevent the entry of dirt and liquids. Moreover, vehicle bodies also have holes that serve to accomplish the production process of alignment of individual body components until their integration into the overall body. Further, in electric vehicles, the batteries are separated from the passenger compartment via the underbody (e.g., above the batteries or accumulators) and/or a battery case. At least one or more openings are formed in the underbody, which openings are closed by means of a corresponding closing plug.

The known holes or openings are typically sealed with rubber-elastic plugs. For this purpose, typical rubber-elastic plugs have a central cavity in the form of a flat cup or bowl shaped region, which is delimited by a first side wall and a first one-sided terminating wall, which is customary in this region. From an end of the side walls opposite the terminus, second walls typically extend diagonally outward, reaching for example to the height of the terminus, so that this wall region is formed in cross-section in an approximately V-shape and corresponds to a ring groove in the top plan view from the bottom side. A circumferential sealing lip typically extends outward from a free end of the outer wall, which lip rests on a body panel in the inserted state, while the circumferential wall which is V-shaped in cross-section penetrates the hole. In order to achieve an anchoring, an outwardly projecting step that is annular or arrow-like in cross-section or a catching element can also be provided on the outer wall, which prevents a sliding out from the opening.

U.S. Pat. No. 6,319,436 B1 describes a closing plug for closing an opening in a planar surface with a plurality of retaining hooks and a circumferential seal, wherein ribs extend from a bottom side of a transverse surface of the plug, which ribs are formed as guide elements upon insertion of the plug. Here, the plug is formed from a hard plastic.

JPS6159067A describes a plug for closing holes in planar objects where said plug is formed from an elastic material and has a first inner circumferential wall, which, in one embodiment, has an outer circumferential step and a lip that interacts with the former, by which means a hole can be closed accordingly. In addition, the plug can be formed as a wave in cross-section with a circumferential V-groove on the top side in which four ribs are formed.

US 2015/0135598 A1 describes a rubber-elastic plug, which includes a circumferential wall and a lip formed from the former, wherein an inner, dome-like elevation is arranged on an inner circumferential surface of the wall, wherein the ceiling of the dome-like elevation is formed with ribs.

US 2014/0361015A1 discloses a closing plug for sealing an opening in a component. This comprises a substantially annular or cylindrical shaft, which is interrupted by ribs that are open to the outside and are hollow. Furthermore, a cone-shaped lip is provided on the shaft, wherein at least one flexible folding zone is provided on the lip, which is reversibly foldable such that, in a folded state of the folding zone, the circumference of the lip in the region of the folding zone and/or an edge of the lip is reduced.

U.S. Pat. No. 9,309,972 describes a plug for closing openings. This plug comprises a radially circumferential side wall as well as a sealing surface formed on the side wall, wherein struts can be provided in the region between the circumferential side wall. According to an exemplary embodiment, it can be provided in this case that the struts extend up to an annular element arranged concentrically to the circumferential side wall, or it is provided that the struts terminate in the region of a central actuation trough configured in the upper wall of the plug.

U.S. Pat. No. 7,114,632 describes a closing lid for closing an opening is disclosed. This closing lid comprises a base body with a circumferential collar that transitions into an elastic lip that abuts one side of a beam. This closing cover can have struts that do not extend from one side of the collar or a radially circumferential side wall to the other. According to a further exemplary embodiment, the closing lid can have a grid-like stiffening structure, wherein corresponding interstices of the grid-like stiffening structure are foamed with PVC.

U.S. Pat. No. 9,233,652 describes a closing plug for closing an opening that comprises an annular sealing portion and a spreading portion configured integrally with the sealing portion. This closing plug can also have struts that are delimited approximately at the center of the closing plug by an element arranged concentrically to the annular sealing portion.

U.S. Pat. No. 8,613,476 describes an apparatus for insertion into an opening of a component of an automobile. Here, a thermoplastic adhesive material is applied circumferentially on a flange, which, when heated, adhesively seals the flange to a component surface. The remaining regions of this apparatus are formed from a different plastic, wherein this apparatus can be produced by means of a 2-part injection molding process.

CN206938651U describes a closing plug produced by means of a 2-part injection molding process, wherein a sealing portion can be formed from a thermoplastic adhesive material, and a base body is formed from a hard component. The sealing body can have an upper wall in the connecting region with the base body, which wall is formed by thin-walled struts in order to manufacture the base body 100 from the hard component and the sealing body from the thermoplastic adhesive material by means of the 2-part injection molding process and to connect them to one another.

SUMMARY

The present disclosure relates generally to a sealing plug, substantially as illustrated by and described in connection with at least one of the figures, as set forth more completely in the claims.

The described closing plug provides for closing through-openings in components, in particular in components of motor vehicles. The problem addressed by the present disclosure is to provide a closing plug for closing through-openings in components, in particular in components of motor vehicles, with which through-openings can be securely and reliably closed.

A further problem for the present disclosure is to provide a closing plug for closing through-openings in components, which is flexible to use. In addition, a problem for the present disclosure is to form a closing plug for sealing through-openings in components, which is an alternative to closing plugs known from the prior art.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DESCRIPTION

Figure 1:
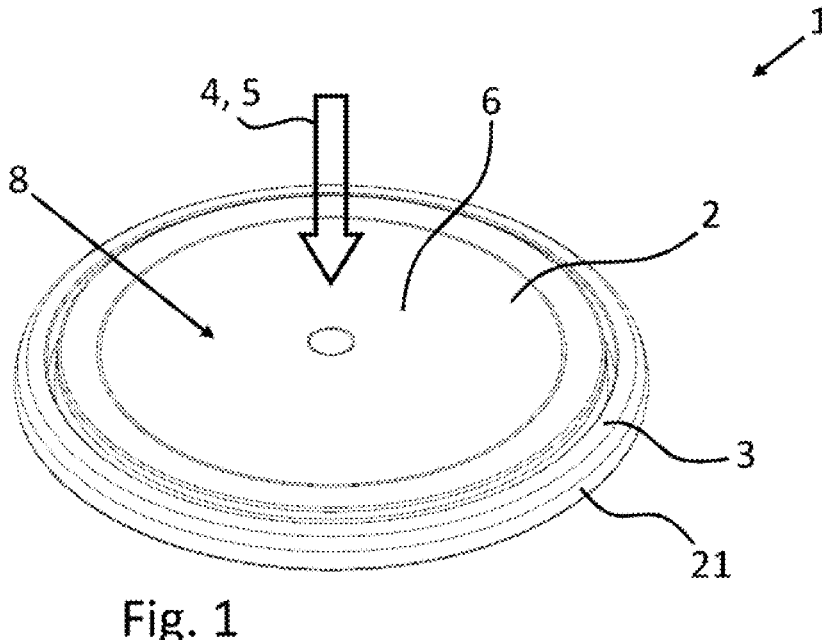
FIG. 1 illustrates perspective view of a closing plug according to the disclosure according to a first example, without form-fit recesses.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

One or more of these problems are solved by the features of the independent claims 1 and 10. Advantageous configurations are specified in the respective dependent subclaims.

According to the disclosure, a closing plug is provided for closing through-openings in components, in particular in components of motor vehicles. The closing plug comprises a base body made from a hard component with a closing wall for covering a through-opening, and a sealing/fastening device made from a soft component, which is configured to be sealed and connected to a wall of a carrier component that bounds a through-opening, wherein the closing plug can be inserted into a through-opening in an assembly direction that extends orthogonally to a wall of a carrier component that bounds a through-opening.

With the closing plug according to the disclosure, an apparatus consisting of a hard component and a soft component is provided for the first time, in which the soft component is configured for connection to a carrier component as well as for sealing against such a carrier component.

The closing plug is thus free of catching means or does not comprise any catching means formed from the hard component. This results in fewer assembly forces for a user, because only the soft component needs to be deformed for connection to a component.

In particular, different sheet thicknesses can be covered by means of the closing plug according to the disclosure. That is to say, a closing plug according to the disclosure can be used in order to close through-openings in components having different material thicknesses or sheet thickness. The closing plug according to the disclosure is configured such that openings in carrier components having different sheet thicknesses of at least about 0.2 mm or 0.4 mm or 0.6 mm or 0.8 mm to about 1.5 mm or 2 mm or 2.5 mm or 3 mm or 3.5 mm or 4 mm can be covered or closed with a single closing plug.

Because the closing wall of the base body is formed from a hard component and the closing plug is sealingly connected to a component via the soft component, the closing plug according to the disclosure is also more resistant to aging and environmental tests.

The structural design of the closing wall also prevents a so-called "sinking" or "push-through" in the corresponding tests. This will be described in detail below.

Furthermore, the closing plug according to the disclosure is characterized by lower production costs during manufacture by means of an injection molding process, because such an injection molding process can be carried out without the use of pusher devices due to the structural design of the closing plug. The closing plug according to the disclosure is therefore very simple and inexpensive to manufacture.

A further advantage of the closing plug according to the disclosure is that the connection via the soft component with a component requires a substantially smaller design space. The closing plug is thus compact in design and only has a low design space requirement.

The base body can comprise a radially circumferential first connecting wall arranged approximately orthogonal to the closing wall for connection to the sealing/fastening device.

First form-fit recesses, which are arranged in a radially circumferential manner and preferably uniformly spaced apart from one another and extend radially inward, can be formed in the first connecting wall for connecting to correspondingly configured first form-fit elements of the sealing/fastening device.

With the closing plug according to the disclosure, the advantages of a 1-part closing plug and a 2-part closing plug are combined with one another. In particular, the synergistic effect of the soft component in connection with a hard component is exploited, such that it is used for both sealing and connection to a carrier component.

1-part closing elements made of soft materials tend to be pushed "through" the opening in the case of large openings due to their flexibility and ductility, and thus possess low retaining forces for large openings.

For this purpose, 2-part closing elements are more advantageous in order to address the aforementioned problems, however, with an increasing number of catching means on the hard component, the assembly force of the closing element also increases, because a circumferential seal must be pushed evenly with a specific force to the top of the opening. This is also corrected by the new disclosure.

The sealing/fastening device can be connected to the base body in a form-fit manner via the first form-fit recesses.

The first form-fit recesses hold the sealing/fastening device or subject it to a radially inward acting force, so that the sealing/fastening device cannot be separated from the base body in a radially outward direction.

Second form-fit recesses, which are arranged in a radially circumferential manner and preferably uniformly spaced apart from one another and extend counter to the assembly direction, can be formed in an outer edge of the closing wall for connecting to correspondingly configured second form-fit elements of the sealing/fastening device.

Preferably, the radially circumferential first connecting wall can be radially inwardly offset with respect to a radially circumferential outer edge of the base wall.

Both the first and second form-fit recesses can also be configured to be approximately T-shaped, mushroom-shaped, or conical or convex in cross-section.

By means of the second form-fit recesses, the sealing/fastening device is subject to a force acting counter to the assembly direction, so that the sealing/fastening device cannot be separated from the base body.

In addition to the form-fit connection of the sealing/fastening device to the base body via the first and the second form-fit recesses and the correspondingly configured first and second form-fit elements of the sealing/fastening device, the sealing/fastening device can also be chemically and/or materially connected to the base body.

The form-fit recesses generally have a constant cross-section in the assembly direction, which allows for a simple deformation in the manufacture of the closing plug by means of an injection molding process. Furthermore, the form-fit recesses can have a circular, elliptical, or polygonal cross-section.

The base body is made from a hard component. The hard component can preferably be made of PP (polypropylene) or, for example, also PBT (polybutylene terephthalate), PA (polyamide), POM (polyoxymethylene), or of a comparable material.

The sealing/fastening device is made from a soft component. The soft component can preferably be made from TPV (thermoplastic rubbers) or, for example, also from TPE-S (thermoplastic elastomer based on styrenic block copolymers) or TPU (thermoplastic polyurethane), or from a comparable material.

Furthermore, a combination of materials consisting of PP and TPV has proven to be advantageous, because they have a particularly good chemical adhesion and/or bond between the hard component and the soft component. In particular, in this material combination, but also in others, form-fit recesses can be omitted.

In principle, the form-fit recesses cause an additional form-fit connection between the hard component and the soft component. However, they are not absolutely necessary for a closing plug according to the disclosure, but rather are optional.

The sealing/fastening device can be configured to surround a contour of a through-opening, for example in an annular manner, and can have a second connecting wall for connecting to the base body, wherein first form-fit elements, which extend radially inwardly and correspond to the first form-fit recess, and/or second form-fit elements, which extend counter to the assembly direction and are configured to correspond to the second form-fit recesses, can be molded on the section connection wall so that the sealing/fastening device is connected to the base body in a form-fit manner. The first and second connecting walls extend approximately in the assembly direction and are in particular arranged approximately concentrically to one another.

By connecting the sealing/fastening device to the base body via the first and second form-fit recesses and the correspondingly formed first and second form-fit elements, a secure and tight connection is formed between the sealing/fastening device and the base body.

The sealing/fastening device can also have a different shape corresponding to a geometry of an opening to be closed or a through-opening, and therefore can also be oval, elliptical (in order to close an oblong hole), polygonal, or rectangular in shape. In principle, the closing plug can have any shape in order to seal openings that are correspondingly configured in cross-section. This means that the geometry circumferentially follows the contour of a through-opening of a carrier component to be closed.

For all of the above-mentioned shapes, all embodiments of the device according to the disclosure are also provided, for example with regard to the first and second connecting walls, as well as the associated technical effects and advantages.

The sealing/fastening device can comprise a sealing wall, which is formed by a radially circumferential outer sheath wall of the closing plug for sealing against an inner sheath wall of a through-opening of a component.

The sealing wall additionally generates a force acting radially outward, so that the closing plug is held sealingly in a through-opening of a component.

With a front region, when viewed in the assembly direction, the sealing wall can preferably be connected to the second connecting wall such that the second connecting wall and the sealing wall bound an approximately U-shaped or V-shaped. annular groove.

By providing the sealing wall, which is formed as a radially circumferential outer sheath wall of the closing plug, a seal against an inner sheath wall of a through-opening of a component is possible.

This is particularly advantageous, because, in the case of corresponding environmental and/or aging tests or a stress on the closing plug with a force acting in the assembly direction, no collapsing of the closing wall is possible, because the outer sheath wall is then pressed onto the inner sheath wall of the component with a higher force or a stronger contact pressure, and in this way the sealing effect is increased.

A radially circumferential lip or stopping wall can be molded onto a region of the closing wall positioned counter to the assembly direction for abutting a surface of a component that bounds a through-opening of a component.

This stopping wall bounds a movement of the closing plug in the assembly direction and prevents pushing through a through-opening of a carrier component.

The lip could additionally be configured as a sealing lip for sealing against an inner sheath wall of a through-opening of a component in order to realize a second seal against a surface of the component that bounds a through-opening, and thus additionally a seal against a component surface. However, such a configuration is not preferred.

Such a double seal is much denser than a simple sealing of closing plugs, and thus protects securely and reliably against liquid penetration.

The sealing of the closing plug according to the disclosure also has a positive effect on the results of corresponding environmental and/or aging tests.

A radial wall arranged radially circumferentially and extending radially outward can be molded on the sealing wall.

This radial wall allows for easier disassembly of the closing plug, because it allows for an orderly or controlled buckling of the soft component in this region.

Via the radial wall, the closing plug according to the disclosure can thus be detached or disassembled from a through-opening of a component in a simple manner.

Not preferably, the radial wall can also be configured as a catching wall with a corresponding catching edge for rearwardly engaging with a portion of a component that bounds the through-opening.

By means of the radially circumferential catching wall, a pressure acting on the closing plug is radially circumferentially and evenly distributed. This is usually not given or not possible in the case of apparatuses with catching elements made of a hard component, because the catching elements are mostly not arranged in a radially circumferential manner or equally spaced apart for manufacturing reasons, but rather there are usually faults where no catching elements are provided.

The closing wall can be domed or convex, in particular counter to the assembly direction.

By forming the closing wall in such a convex or bulbous or spherically segmented or domed fashion, a sagging of the closing wall of the base body, in particular during aging and/or environmental tests, is safely and reliably prevented. A corresponding "sinking behavior" does not take place in the closing plug according to the disclosure or only in a very small form, and a push-through is prevented.

An automated assembly of the closing plug is generally possible. However, the bulbous shape facilitates the assembly, because when the plug is inserted, it must be slightly "strained." In addition, this is haptically advantageous.

In particular, the bulbous design of the closing wall simplifies an automated assembly of the closing plug according to the disclosure.

Alternatively, a planar configuration of the closing wall is also possible, so that it extends approximately orthogonally to the assembly direction.

Depending on the combination of materials of the hard and soft component, a curvature of the closing wall can be required in order to also pass corresponding aging tests.

The closing wall can have stiffening elements or structures, preferably on a closing side facing in the assembly direction.

These stiffening elements can be configured as stiffening ribs arranged in a radially circumferential manner and equally spaced apart from one another, in particular in the manner of a spoke.

With the stiffening structure of the stiffening elements, the closing plug has an increased stability; in addition, the sinking behavior as described above in the curved surface is significantly improved, and push-throughs are prevented.

Alternatively, the stiffening elements can be formed by a honeycomb structure or one or more stiffening rings, in particular arranged concentrically to one another.

Furthermore, according to the present disclosure, a method for producing a closing plug as described above is provided, wherein the closing plug is produced by means of a 2-part injection molding process.

By means of such an injection molding process, the closing plug according to the disclosure can be produced in a simple, inexpensive manner.

This is in particular due to the fact that the method can be carried out without the use of pusher devices, i.e. the production can be carried out without pushers.

According to the disclosure, a closing plug 1 is provided for closing through-openings in components, in particular in components of motor vehicles. It comprises a base body 2 and a sealing/fastening device 3 connected thereto. The closing plug according to the disclosure will be described in greater detail below on the basis of a first and second examples (FIGS. 1 to 5 according to a first example and FIGS. 6 to 12 according to a second example). Both exemplary embodiments have the same technical features, unless otherwise stated.

Figure 2:
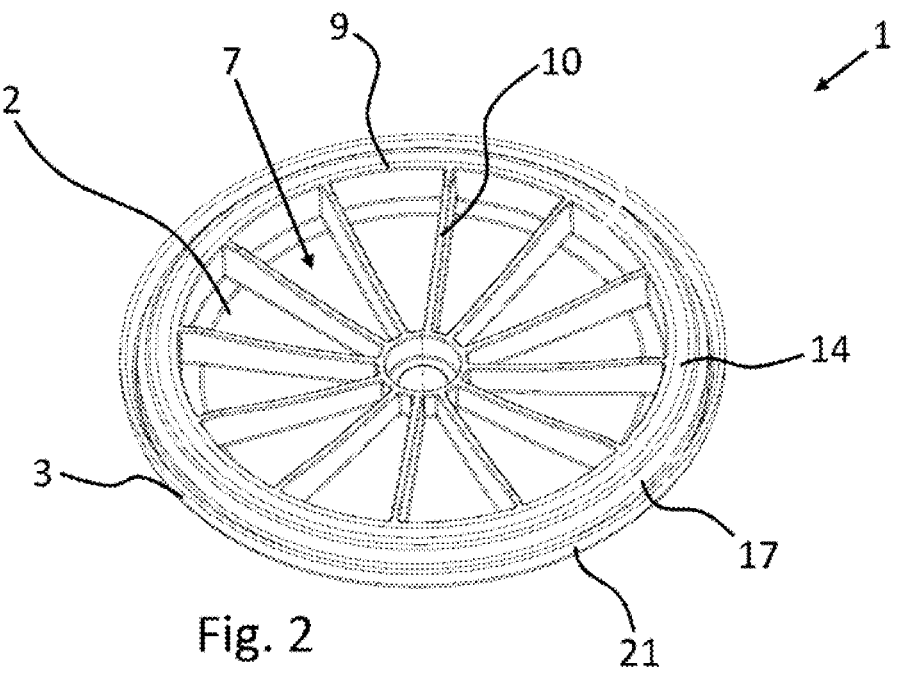
FIG. 2 illustrates a perspective view of a closing plug according to the disclosure according to the first example.
Figures 3, 4, 5:
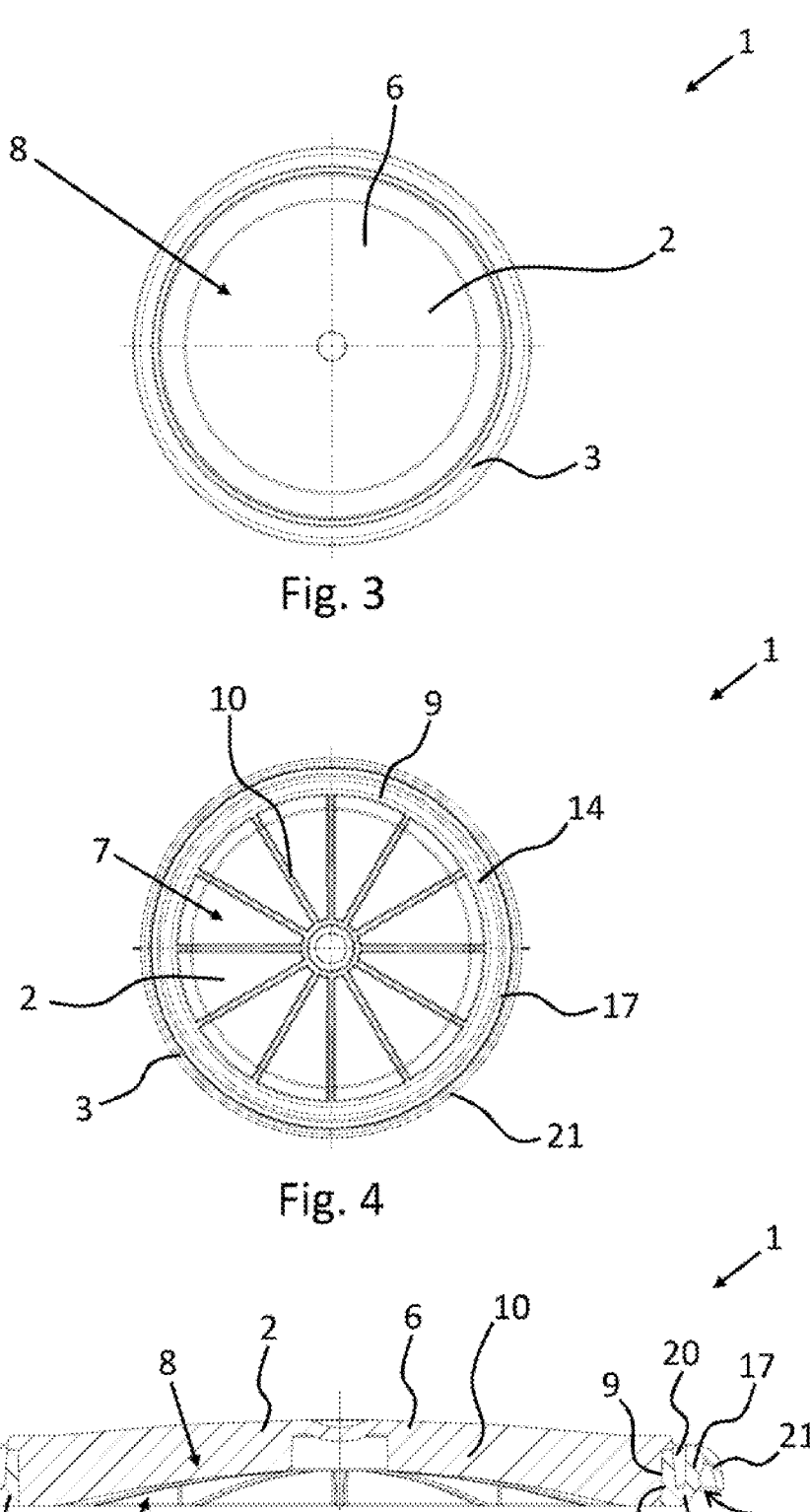
FIG. 3 illustrates an aerial view from above onto a covering side of the closing plug.
FIG. 4 illustrates an aerial view from below onto a closing side of the closing plug.
FIG. 5 illustrates a perspective, laterally cut view of the closing plug according to the disclosure.

FIGS. 1 and 2 illustrate perspective views of a closing plug 1 according to a first example, without form-fit recesses 12, 13. FIGS. 3 and 4 illustrate, respectively, aerial views from above onto a covering side of and from below onto a closing side of the closing plug 1. FIG. 5 illustrates a perspective, laterally cut view of the closing plug 1 according to the disclosure.

The base body 2 is made from a hard component. The hard component is preferably formed from PP and can alternatively be made from, for example, PBT, PA, or POM or from a comparable material.

The closing plug 1 is provided to be inserted into a through-opening of a component in an assembly direction 4.

In the context of the present disclosure, an assembly direction 4 is understood to mean a direction that extends orthogonally to a surface of a component that bounds a through-opening of the component.

The base body is formed approximately in a disc shape, wherein it comprises a closing wall 6 extending orthogonally to an axial direction 5. The closing wall 6 is configured to cover a through-opening of a component.

In particular, the closing wall 6 is designed in a convex manner.

The closing wall 6 further comprises a closing side 7 facing in the assembly direction and a covering side 8 opposite the closing side.

Furthermore, a radially circumferential first connecting wall 9 extending in the assembly direction 4 is molded onto the closing wall 6.

The first connecting wall 9 is radially inwardly offset with respect to a radially circumferential outer edge of the closing wall.

Stiffening struts 10 are molded onto the connection side 7 of the base body 2, being radially circumferential and equally spaced apart from one another and extending radially inwardly to the first connecting wall 9.

According to the second example (FIGS. 6 to 12), approximately semi-cylindrically configured form-fit bodies 11 facing inwardly in the radial direction and extending in the axial direction are molded onto the first connecting wall 9.

In the form-fit bodies 11, first form-fit recesses 12 extending radially inward are formed.

The first form-fit recesses 12 are configured in the form of a balloon or a teardrop in cross-section or in an aerial view from below or from above. Alternatively, the first form-fit recesses 12 can also be configured to be approximately T-shaped, mushroom-shaped, or conical or convex.

In addition, second form-fit recesses 13 can be arranged equally spaced from one another. The second form-fit recesses 13 are approximately mushroom-shaped in cross-section or in a lateral section. Alternatively, the second form-fit recesses 13 can be configured analogously to all embodiments of the first form-fit recesses 12.

According to the first example, neither first nor second form-fit recesses 12, 13 are provided (FIGS. 1 to 5)

According to these exemplary embodiments, the sealing/fastening device 3 is approximately circular in shape.

Alternatively, in addition to a circular shape, the closing apparatus can also be configured in an elliptical manner in order to cover oblong holes or polygonal and can thus be configured to follow the contour of a through-opening of a carrier component to be closed.

The sealing/fastening device 3 is made from a soft component. The soft component is preferably made from TPV and can, for example, also be made from TPE-S or TPU or from a comparable material.

The sealing/fastening device 3 comprises a second connecting wall 14 for connecting to the base body 2. The second connecting wall 14 also extends approximately in the assembly direction 4 and is arranged concentrically to the first connecting wall 9.

First form-fit elements 15 extending radially inward are molded onto the second connecting wall 14. The first form-fit elements 15 are configured to correspond to the first form-fit recesses 12 of the base body.

Second form-fit elements 16 extending counter to the assembly direction 4 or in the axial direction 5 are further formed on the second connecting wall. The second form-fit elements 16 are configured to correspond to the second form-fit recesses 13 of the base body 2.

In the first example, the connection of the soft and hard component is carried out chemically and/or materially by means of a 2-part injection molding process, preferably during the manufacture of the closing plug.

According to the second example, the connection of the soft and hard components is also done chemically and/or materially and additionally in a form-fit manner via the first and second form-fit recesses 12, 13 and the correspondingly configured first and second form-fit elements 15, 16, preferably during the manufacture of the closing plug by a 2-part injection molding process.

Figure 6:
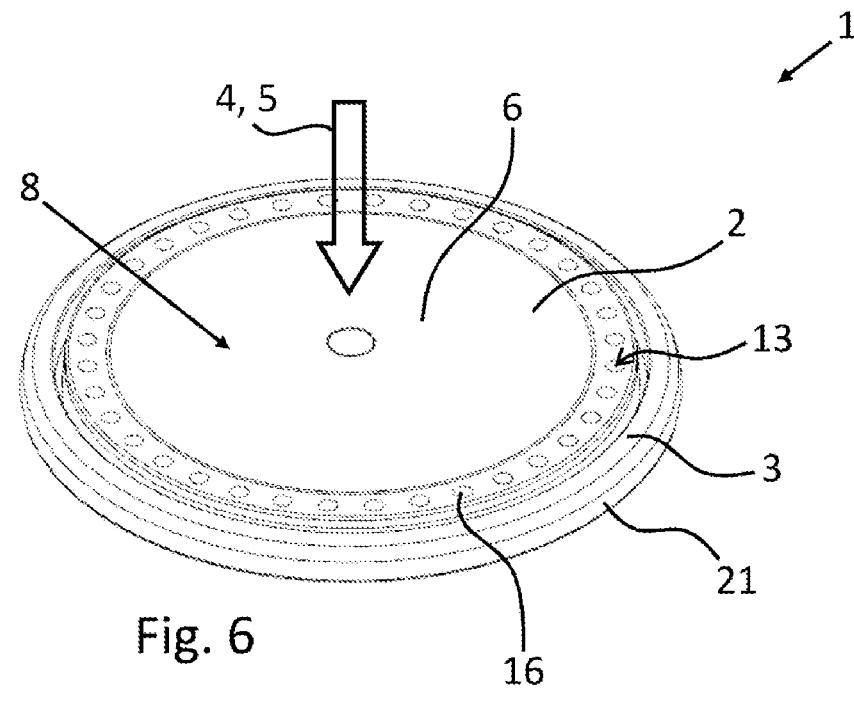
FIG. 6 illustrates a perspective view of a closing plug according to the disclosure according to a second example, with form-fit recesses.
Figure 7:
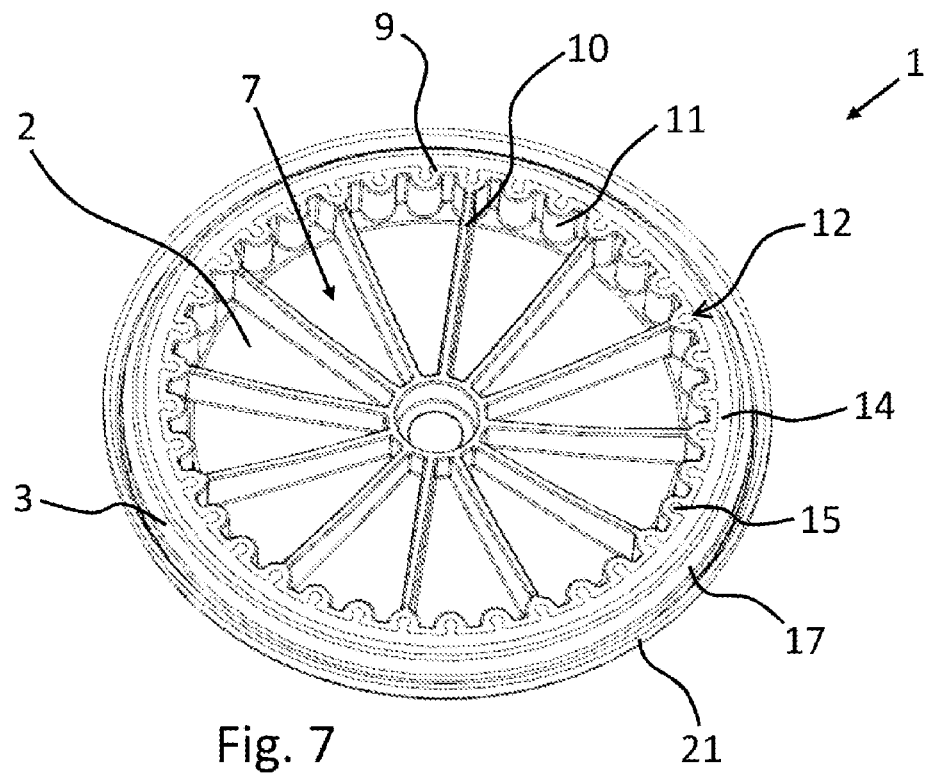
FIG. 7 illustrates a perspective view of a closing plug according to the disclosure according to the second example.
Figure 8:
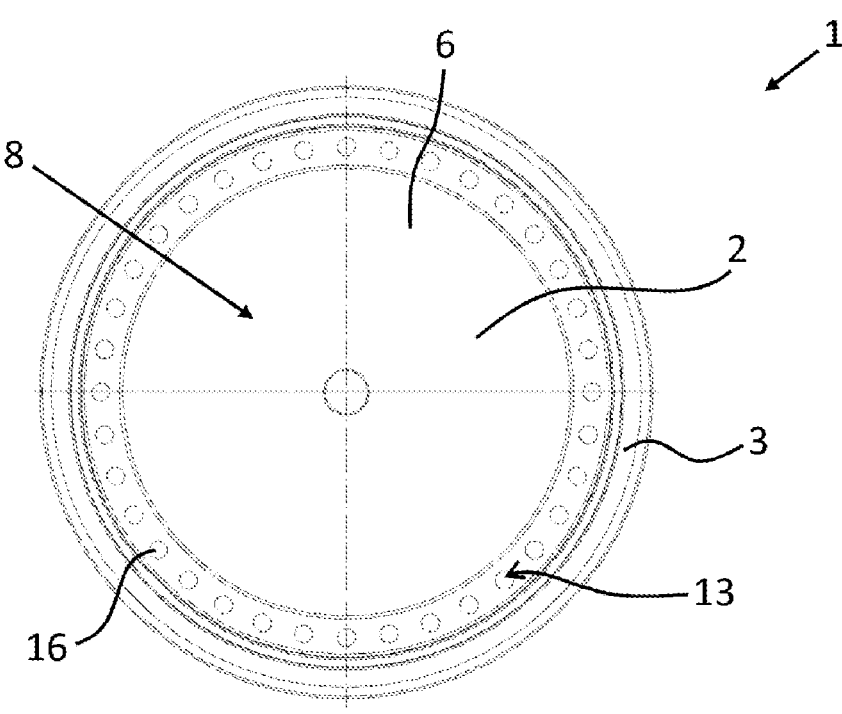
FIG. 8 illustrates an aerial view from above onto a covering side of the closing plug.
Figure 9:
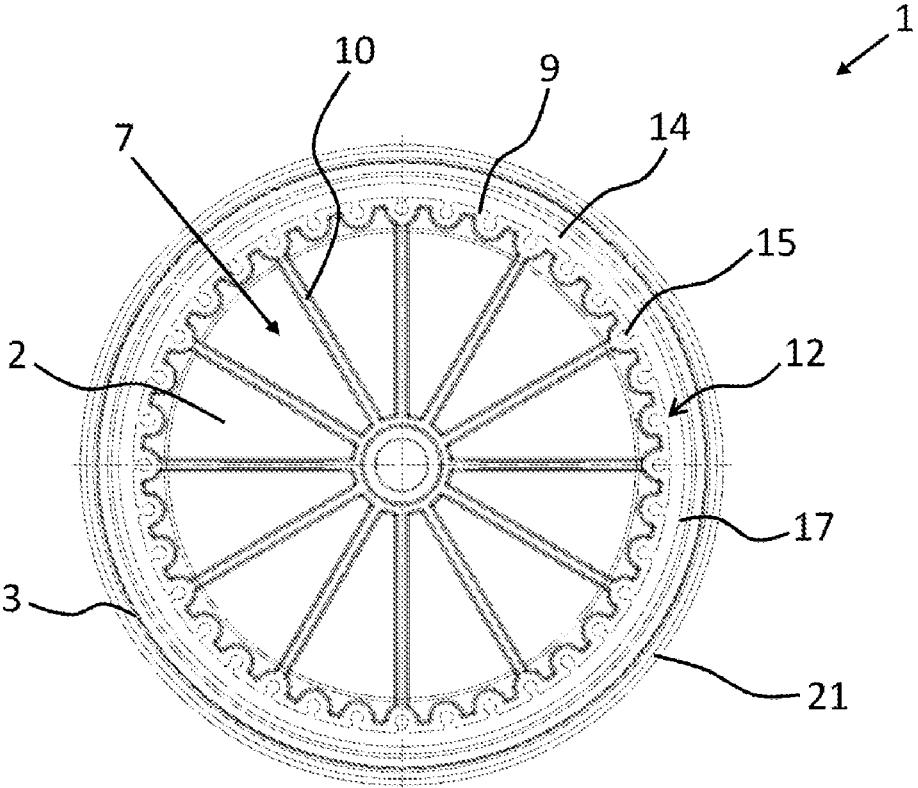
FIG. 9 illustrates an aerial from below onto a closing side of the closing plug.
Figure 10:
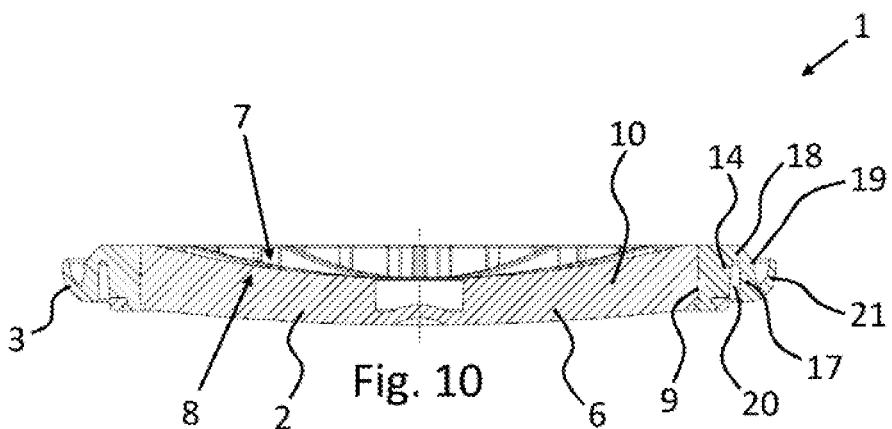
FIG. 10 illustrates a laterally cut view of the closing plug according to the disclosure.
Figure 11:
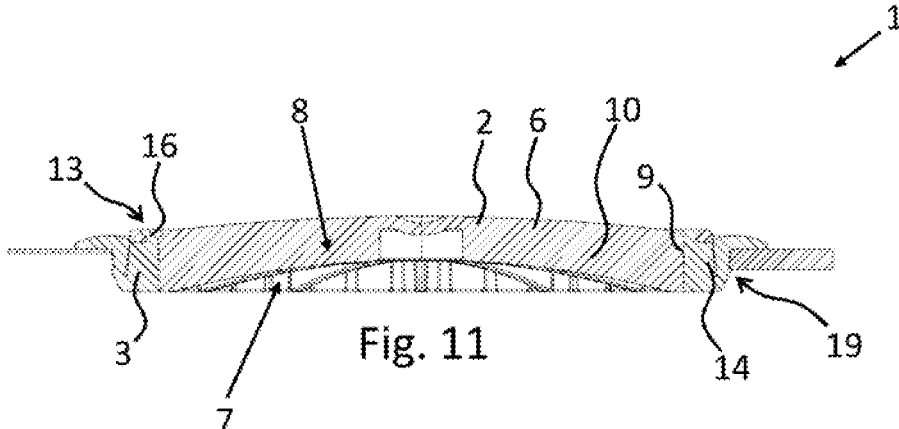
FIG. 11 illustrates a laterally cut view of the closing plug according to the disclosure in a state of being mounted in a through-opening of a component.
Figure 12:
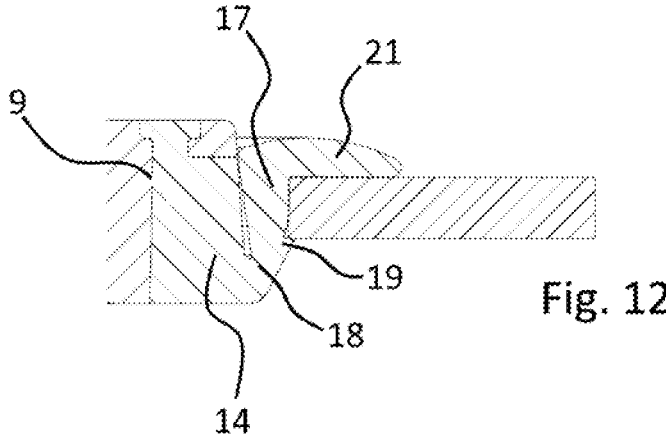
FIG. 12 illustrates a detail view from FIG. 11.

FIGS. 6 and 7 illustrate perspective views of a closing plug 1 according to a second example, with form-fit recesses 12, 13. FIGS. 8 and 9 illustrate, respectively, aerial views from above onto a covering side of the closing plug 1 and from below onto a closing side of the closing plug 1. FIG. 10 illustrates a laterally cut view of the closing plug 1, while FIG. 11 illustrates a laterally cut view of the closing plug 1 in a state of being mounted in a through-opening of a component. FIG. 12 illustrates a detail view from FIG. 11.

The second connecting wall 14 or a front region of the second connecting wall 14, when viewed in the assembly direction, is connected to a sealing wall 17.

The sealing wall 17 of the sealing/fastening device 3 is arranged approximately concentrically to the first and second connecting walls 9, 14 and extends radially circumferentially in approximately the assembly direction 4 or axial direction 5.

The sealing wall generates a force acting radially outward, so that the closing plug 1 is held sealingly in a through-opening of a component.

A radial wall 18, which is also radially circumferential and extends outwards in the radial direction, is molded onto a front region of the sealing wall 17, when viewed in the assembly direction 4.

This radial wall 18 allows for easier disassembly of the closing plug, because it allows for an orderly or controlled buckling of the soft component in this region.

According to a non-preferred exemplary embodiment, the radial wall 18 can also be configured as a catching wall and can comprise a corresponding catching edge 19 or catching surface for rearwardly engaging with a portion of a component that bounds the through-opening.

A radially circumferential outer lateral surface 20 of the sealing wall is configured to sealingly abut an inner sheath wall of a through-opening of a component.

A radially circumferential lip 21 or stopping wall is molded onto the sealing wall 17 at an end positioned counter to the assembly direction 4 for abutting a surface of a component that bounds a through-opening of a component.

The stopping wall prevents a pushing of the closing plug 1 through a through-opening, because it limits a movement or displacement of the closing plug 1 in the assembly direction 4. Furthermore, according to the present disclosure, a method for manufacturing a closing plug 1 as defined above is described.

According to such a method, the closing plug can be manufactured by means of a 2-part injection molding process. This method can be carried out in an injection molding apparatus without a pusher device.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

LIST OF REFERENCE NUMERALS

1 Closing plug
2 Base body
3 Sealing/fastening device
4 Assembly direction
5 Axial direction
6 Closing wall
7 Closing side
8 Covering side
9 First connecting wall
10 Stiffening struts
11 Form-fit body
12 First form-fit recess
13 Second form-fit recess
14 Second connecting wall
15 First form-fit element
16 Second form-fit element
17 Sealing wall
18 Radial wall
19 Catching edge
20 Outer lateral surface
21 Stopping wall

The invention claimed is:

1. A closing plug for closing through-openings in components of a vehicle, the closing plug comprising:
 a base body made from a hard component with a closing wall for covering a through-opening; and
 a sealing device made from a soft component, which is configured to be sealed and connected to a wall of a carrier component that bounds the through-opening,
  wherein the closing plug can be inserted into the through-opening in an assembly direction that extends orthogonally to a wall of the carrier component that bounds the through-opening,
  wherein the base body comprises a radially circumferential first connecting wall arranged approximately orthogonal to the closing wall for connection to the sealing device, and
  wherein first form-fit recesses which are arranged in a radially circumferential manner and extend radially inward, are formed in the first connecting wall for connecting to correspondingly configured first form-fit elements of the sealing device.

2. The closing plug according to claim 1, wherein the first form-fit recesses are uniformly spaced apart from one another.

3. The closing plug according to claim 1, wherein second form-fit recesses, which are arranged in a radially circumferential manner and extend counter to the assembly direction, are formed in an outer edge of the closing wall for connecting to correspondingly configured second form-fit elements of the sealing device.

4. The closing plug according to claim 3, wherein the second form-fit recesses are uniformly spaced apart from one another.

5. The closing plug according to claim 3, wherein the radially circumferential first connecting wall is radially inwardly offset with respect to a radially circumferential outer edge of the closing wall.

6. The closing plug according to claim 3,
 wherein the sealing device is configured to follow a contour of the through-opening of the carrier component, in a circumferential manner, and comprises a second connecting wall for connecting to the base body,
 wherein first form-fit elements extending radially inwardly and configured to correspond to the first form-fit recesses and/or the second form-fit elements extending counter to the assembly direction and configured to correspond to the second form-fit recesses are formed on the second connecting wall, so that the sealing device is connected to the base body in a form-fit manner.

7. The closing plug according to claim 6, wherein the sealing device comprises a sealing wall, which forms a radially circumferential outer sheath wall of the closing plug for sealing against an inner sheath wall of a through-opening of a component, when viewed in the assembly direction, such that the second connecting wall and the sealing wall bound an approximately U-shaped or V-shaped annular groove.

8. The closing plug according to claim 7, wherein the sealing wall is connected to the second connecting wall in a front region.

9. The closing plug according to claim 7, wherein a radially circumferential lip or stopping wall is molded on a region of the sealing wall positioned counter to the assembly direction for abutting a surface of a component that bounds a through-opening of a component.

10. The closing plug according to claim 9, wherein a radially circumferentially arranged and radially outwardly extending catching wall with a corresponding catching edge is molded on the sealing wall for rearwardly engaging with a portion of a component that bounds the through-opening.

11. The closing plug according to claim 1, wherein the closing wall is domed.

12. The closing plug according to claim 1, wherein the closing wall is planar.

13. The closing plug according to claim 1, wherein the closing wall comprises stiffening elements.

14. The closing plug according to claim 1, wherein the closing wall comprises stiffening elements on a closing side facing in the assembly direction.

15. A method for manufacturing a closing plug according to claim 1, wherein the closing plug is manufactured by means of a 2-part injection molding process.

16. The method according to claim 15, wherein the method is carried out without pusher devices.

17. A closing plug for closing through-openings in components of a vehicle, the closing plug comprising:
 a rigid base body including a closing wall configured to cover a through-opening; and a pliable sealing device configured to seal against and be connected to a wall of a carrier component that bounds the through-opening, wherein the closing plug is configured to be inserted into the through-opening in an assembly direction that extends orthogonally to the wall of the carrier component that bounds the through-opening, wherein the rigid base body comprises a radially circumferential first connecting wall arranged approximately orthogonal to the closing wall and configured to connect to the pliable sealing device, and wherein the first connecting wall includes a plurality of form-fit recesses arranged in a radially circumferential manner and extending radially inward, the form-fit recesses being configured to engage correspondingly configured form-fit elements of the pliable sealing device.

18. The closing plug according to claim 1, wherein the closing wall is domed.

19. The closing plug according to claim 1, wherein the closing wall is planar.

20. The closing plug according to claim 1, wherein the closing wall comprises stiffening elements.

\* \* \* \* \*